United States Patent
Yamazaki (10) Patent No.: US 12,447,634 B2
(45) Date of Patent: Oct. 21, 2025

(54) CONTROL METHOD FOR CONTROL DEVICE CONTROLLING ROBOT ARM, NON-TRANSITORY COMPUTER-READABLE STORAGE MEDIUM STORING COMPUTER PROGRAM, AND CONTROL DEVICE

(71) Applicant: SEIKO EPSON CORPORATION, Tokyo (JP)

(72) Inventor: Takema Yamazaki, Fujimi (JP)

(73) Assignee: SEIKO EPSON CORPORATION (JP)

( * ) Notice: Subject to any disclaimer, the term of this patent is extended or adjusted under 35 U.S.C. 154(b) by 354 days.

(21) Appl. No.: 18/081,840

(22) Filed: Dec. 15, 2022

(65) Prior Publication Data

US 2023/0191631 A1    Jun. 22, 2023

(30) Foreign Application Priority Data

Dec. 16, 2021    (JP) ................. 2021-204004

(51) Int. Cl.
    *H02P 21/22*      (2016.01)
    *B25J 19/00*      (2006.01)
    *B25J 19/02*      (2006.01)
    *H02P 5/46*      (2006.01)

(52) U.S. Cl.
    CPC ....... *B25J 19/0025* (2013.01); *B25J 19/0054* (2013.01); *B25J 19/027* (2013.01)

(58) Field of Classification Search
    CPC .......... H02P 6/34; H02P 2101/45; H02P 6/20; H02P 6/21; H02P 6/24; H02P 1/42; H02P 2209/07; H02P 27/047; H02P 6/16; H02P 6/18; H02P 6/182; H02P 9/305; H02P 9/48; H02P 9/30

See application file for complete search history.

(56) References Cited

U.S. PATENT DOCUMENTS

2017/0047784 A1*   2/2017   Jung ...................... H02J 50/80
2017/0203445 A1*   7/2017   Owa ................... B25J 19/0054
2020/0206915 A1*   7/2020   Yamazaki ............. B25J 19/005

FOREIGN PATENT DOCUMENTS

JP    2006-196499 A    7/2006
JP    2006-280076 A    10/2006
JP    2013-138041 A    7/2013

OTHER PUBLICATIONS

"De-Energization Type Micro Electromagnetic Brake Applicable to RoH2", Published by ASA Electronics Industry Co., Ltd., Published Sep. 2019, with English translation (15 Pages).

* cited by examiner

*Primary Examiner* — Kawing Chan
*Assistant Examiner* — Charles S Laughlin
(74) *Attorney, Agent, or Firm* — Harness, Dickey & Pierce, P.L.C.

(57) ABSTRACT

A method according to the present disclosure includes: (a) carrying out overexcitation of an electromagnetic brake; (b) controlling a fan cooling a control device in such a way that a power consumption of the fan becomes a first power consumption in an overexcitation period during which the overexcitation is carried out; and (c) controlling the fan in such a way that the power consumption of the fan becomes a second power consumption higher than the first power consumption, after the overexcitation period.

9 Claims, 6 Drawing Sheets

CONTROL METHOD FOR CONTROL DEVICE CONTROLLING ROBOT ARM, NON-TRANSITORY COMPUTER-READABLE STORAGE MEDIUM STORING COMPUTER PROGRAM, AND CONTROL DEVICE

The present application is based on, and claims priority from JP Application Serial Number 2021-204004, filed Dec. 16, 2021, the disclosure of which is hereby incorporated by reference herein in its entirety.

BACKGROUND

1. Technical Field

The present disclosure relates to a control method for a control device controlling a robot arm, a non-transitory computer-readable storage medium storing a computer program, and a control device.

2. Related Art

JP-A-2006-280076 discloses a control device having a drive circuit that drives a motor of a robot, and a fan that cools the drive circuit. This control device is configured in such a way that a fan motor is driven using electrical energy stored in a smoothing capacitor, thus cooling the inside of the control device.

As a motor of a robot arm, a motor having an overexcitation-type electromagnetic brake is known. When starting to electrify such a motor, an overexcitation current is applied to the electromagnetic brake to release the brake and therefore the power consumption of the control device temporarily increases. However, the related art has a problem in that sufficient measures are not taken to restrain the increase in the power consumption of the control device due to the overexcitation of the electromagnetic brake and to efficiently cool the control device.

SUMMARY

According to a first aspect of the present disclosure, a control method for a control device controlling a robot arm having a motor braked by an overexcitation-type electromagnetic brake is provided. The control method includes: (a) carrying out overexcitation of the electromagnetic brake; (b) controlling a fan cooling the control device in such a way that a power consumption of the fan becomes a first power consumption in an overexcitation period during which the overexcitation is carried out; and (c) controlling the fan in such a way that the power consumption of the fan becomes a second power consumption higher than the first power consumption, after the overexcitation period.

According to a second aspect of the present disclosure, a non-transitory computer-readable storage medium storing a computer program for control of a control device controlling a robot arm having a motor braked by an overexcitation-type electromagnetic brake is provided. The computer program causes a processor to execute: (a) processing of carrying out overexcitation control of the electromagnetic brake; (b) processing of controlling a fan cooling the control device in such a way that a power consumption of the fan becomes a first power consumption in an overexcitation period during which the overexcitation is carried out; and (c) processing of controlling the fan in such a way that the power consumption of the fan becomes a second power consumption higher than the first power consumption, after the overexcitation period.

According to a third aspect of the present disclosure, a control device controlling a robot arm having a motor braked by an overexcitation-type electromagnetic brake is provided. The control device includes: a motor diver circuit supplying electric power to the motor; a control power supply supplying electric power to the electromagnetic brake; a fan operating when receiving supply of electric power from the control power supply and thus cooling the control device; and a control unit controlling the motor driver circuit and the fan. The control unit executes: (a) processing of carrying out overexcitation of the electromagnetic brake; (b) processing of controlling the fan in such a way that a power consumption of the fan becomes a first power consumption in an overexcitation period during which the overexcitation is carried out; and (c) processing of controlling the fan in such a way that the power consumption of the fan becomes a second power consumption higher than the first power consumption, after the overexcitation period.

DESCRIPTION OF EXEMPLARY EMBODIMENTS

Figure 1:
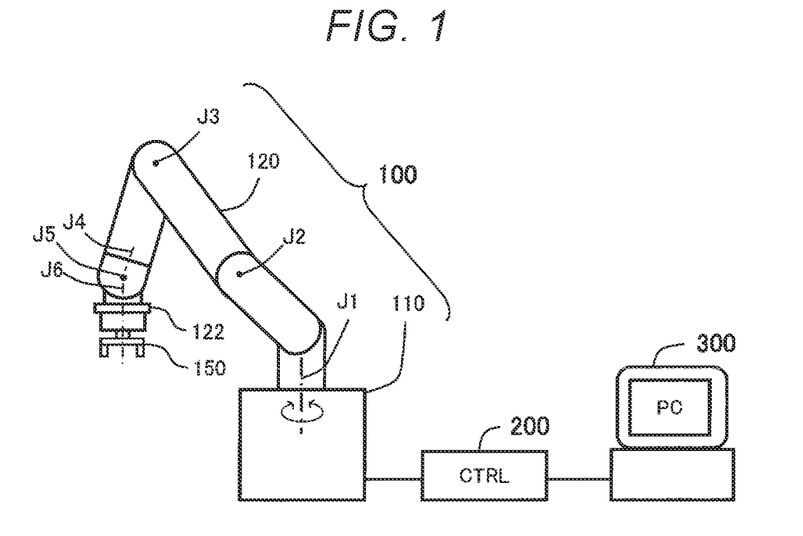
FIG. 1 is an explanatory view showing the configuration of a robot system according to an embodiment.

FIG. 1 is an explanatory view showing an example of a robot system according to an embodiment. The robot system has a robot 100, a control device 200 controlling the robot 100, and an information processing device 300. The information processing device 300 is, for example, a personal computer. A user can input an instruction to cause the robot 100 to operate, using the information processing device 300. This instruction is supplied from the information processing device 300 to the control device 200. In response to the instruction, the control device 200 controls the operation of the robot 100. The control device 200 may also accept an instruction from another external device than the information processing device 300.

The robot 100 has a base 110 and a robot arm 120. An end effector 150 is installed at an arm end 122, which is a distal end part of the robot arm 120. The robot arm 120 is formed of parts sequentially coupled via six joints J1 to J6. Of these joints J1 to J6, three joints J2, J3, J5 are bending joints and the other three joints J1, J4, J6 are torsional joints. While a six-axis robot is described as an example in this embodiment, a robot having any robot arm mechanism having one or more joints can be used. Also, while the robot 100 in this embodiment is a vertical articulated robot, a horizontal articulated robot may be used.

Figure 2:
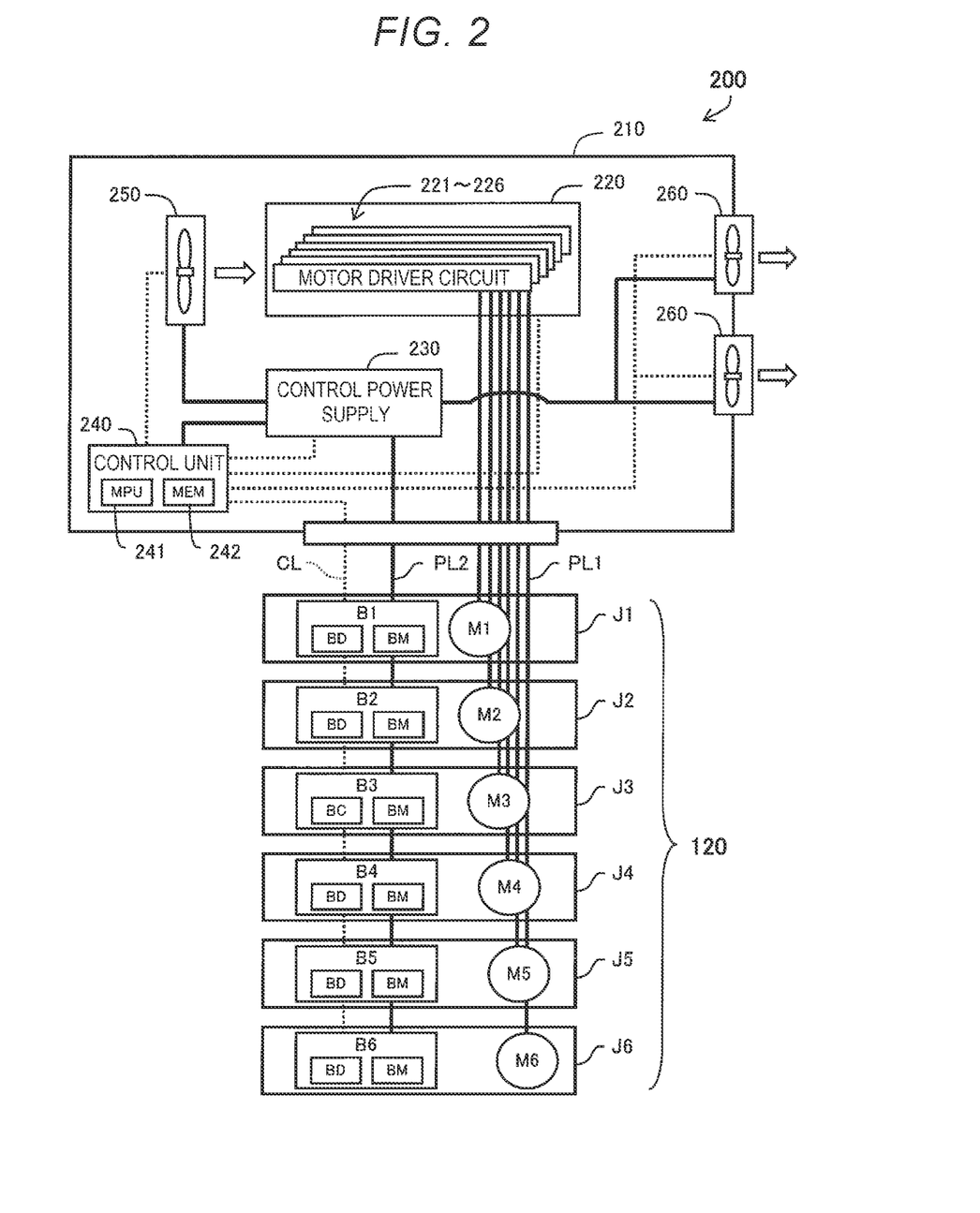
FIG. 2 is a block diagram showing the internal configuration of a control device.

FIG. 2 is a block diagram showing the internal configuration of the control device 200. In FIG. 2, a communication line is drawn as a dotted line and a power line is drawn as a solid line. The plurality of joints J1 to J6 of the robot arm 120 are provided with motors M1 to M6 and overexcitation-type electromagnetic brakes B1 to B6, respectively. The overexcitation type is a system in which, when the power is turned on, a large overexcitation current is applied to switch the electromagnetic brake from a brake active state to a brake release state, and in which subsequently the brake release state is maintained with a hold current smaller than the overexcitation current. When the electrification of the electromagnetic brake is stopped, the electromagnetic brake turns into the brake active state.

The control device 200 has a casing 210, a motor driver unit 220, a control power supply 230, a control unit 240 controlling the other components in the control device 200, a cooling fan 250 blowing air to the motor driver unit 220, and a ventilation fan 260 exchanging the air inside and outside the casing 210. The motor driver unit 220 provides a current to the motors M1 to M6 of the robot arm 120 and thus drives the motors M1 to M6. The motor driver unit 220 has, for example, motor driver circuits 221 to 226 provided corresponding to the motors M1 to M6, respectively. The motor driver circuits 221 to 226 each have a plurality of switching elements such as a transistor and a MOSFET, and switch on and off the switching elements to control the current flowing to the motors M1 to M6 and thus drive the motors M1 to M6. The control power supply 230 supplies electric power to the control unit 240, the cooling fan 250, and the ventilation fan 260, and also supplies electric power to the electromagnetic brakes B1 to B6 of the robot arm 120.

The casing 210 is substantially in the shape of a rectangular parallelepiped and accommodates the other components. The motor driver unit 220 has a power semiconductor such as an IPM (intelligent power module) and is therefore a large heat source. The cooling fan 250 blows air to the motor driver unit 220 and thus cools the motor driver unit 220. The cooling fan 250 also has a function as a circulator circulating the air inside the casing 210. The ventilation fan 260 is attached to a wall of the casing 210 and exchanges the air inside and outside the casing 210 and thus cools the entirety of the control device 200. In the example shown in FIG. 2, two ventilation fans 260 are provided. However, three or more ventilation fans 260 may be provided. Alternatively, only one ventilation fan 260 may be provided. Both of the cooling fan 250 and the ventilation fan 260 function as a fan for cooling the control device 200 and particularly function as a fan for cooling the motor driver unit 220. Also, one of the cooling fan 250 and the ventilation fan 260 may be omitted.

The electric power for the motors M1 to M6 of the robot arm 120 is supplied from the motor driver unit 220 via a first power line PL1. The electric power for the electromagnetic brakes B1 to B6 is supplied from the control power supply 230 via a second power line PL2. The second power line PL2 is coupled to the electromagnetic brakes B1 to B6, for example, in a daisy chain. Coupling via a bus may be used instead of a daisy chain. In any case, it is preferable that the plurality of electromagnetic brakes B1 to B6 are coupled via the second power line PL2, which is a common power supply line.

The electromagnetic brakes B1 to B6 are also coupled to the control unit 240 via a communication line CL. The control unit 240 transmits an operation command to the electromagnetic brakes B1 to B6 via the communication line CL. Each of the electromagnetic brakes B1 to B6 may have a brake unit BM executing the braking on the joint and a brake driver circuit BD driving the brake unit BM. The brake driver circuit BD controls the operation of the brake unit BM in response to the operation command given from the control unit 240. Also, the brake driver circuit BD may be omitted and the control unit 240 may directly control the brake unit BM.

The control unit 240 has a processor 241 and a memory 242. The control unit 240 executes a computer program stored in the memory and thus controls the other components in the control device 200. This computer program may be stored in a non-transitory recording medium such as a hard disk or an optical disk. The functions of the control unit 240 may also be implemented by a hardware circuit.

Figure 3:
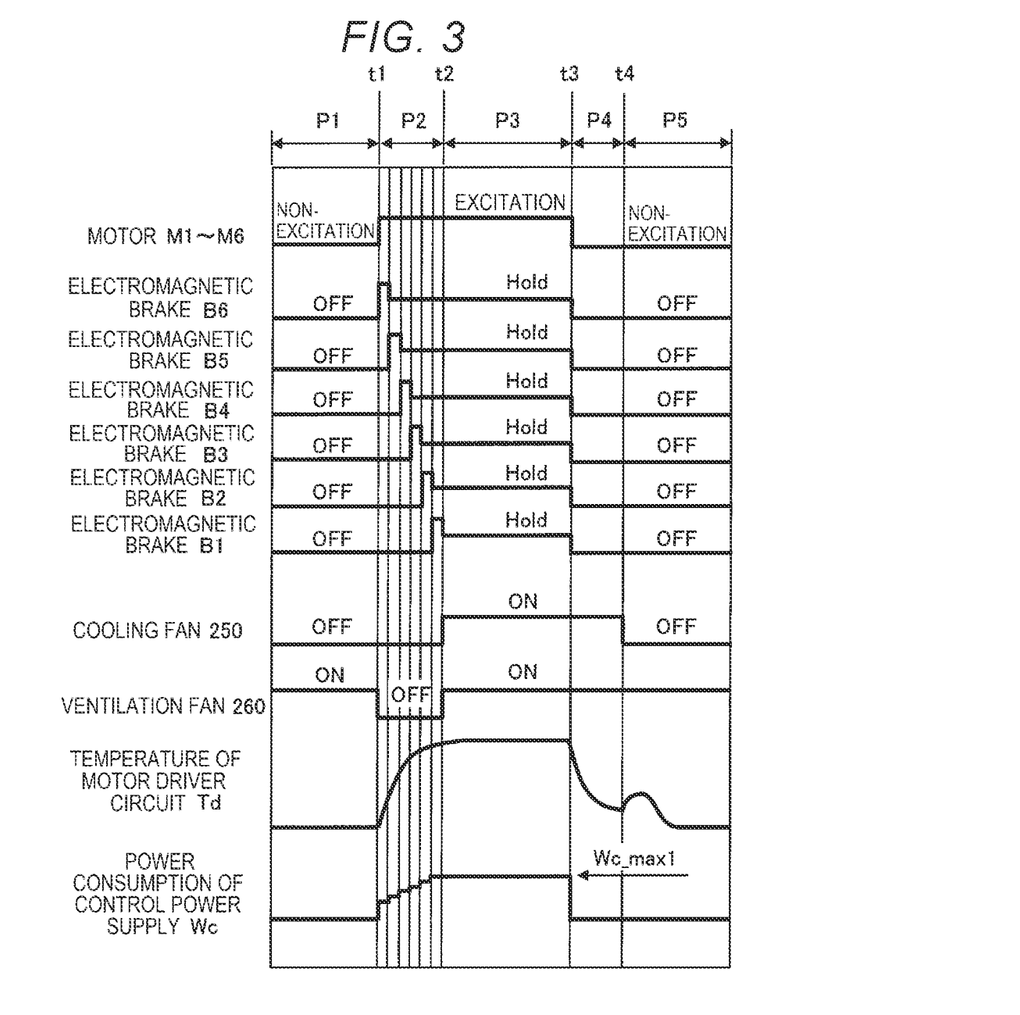
FIG. 3 is a timing chart showing a control operation in the embodiment.

FIG. 3 is a timing chart showing a control operation in the embodiment. This control operation is executed by the control unit 240. FIG. 3 shows changes as described below. While FIG. 3 shows a temperature Td of one of the motor driver circuits 221 to 226 as an example, the temperature Td of any one of these motor driver circuits is expressed in a similar graph.

(1) The excitation/non-excitation state of the motors M1 to M6
(2) The OFF/overexcitation/hold excitation state of the electromagnetic brakes B1 to B6
(3) The ON/OFF state of the cooling fan 250
(4) The ON/OFF state of the ventilation fan 260
(5) The temperature Td of the motor driver circuits 221 to 226
(6) The power consumption Wc of the control power supply 230

The horizontal axis in FIG. 3 represents time and is divided into five periods as described below. The states of the electromagnetic brakes B1 to B6, the cooling fan 250, and the ventilation fan 260 in each period are as described below.

Period P1

A period P1 is a period when the motors M1 to M6 are in the non-excitation state, that is, not supplied with electric power.

The electromagnetic brakes B1 to B6 are in a non-electrified braking state, that is, the brake active state.

The cooling fan 250 is in the OFF state.

The ventilation fan 260 is in the ON state.

The aim of setting the ventilation fan 260 in the ON state is to prevent the control unit 240 from being heated. Even in this period P1, the control unit 240 monitors the state of the robot 100 and is on standby for accepting an input from outside. In the period P1, the amount of heat generated in the control device 200 is smaller than in a period P3 when the robot arm 120 is in operation. Therefore, it is preferable to reduce the cooling ability of the ventilation fan 260 than in the period P3 and thus reduce the power consumption. Specifically, at least one of the plurality of ventilation fans 260 may be on. Alternatively, all the ventilation fans 260 may be on but the number of rotations thereof may be less than in the period P3.

Period P2

A period P2 is a period immediately after the excitation of the motors M1 to M6 is started. The period P2 is an overexcitation period when the overexcitation of the electromagnetic brakes B1 to B6 is carried out. The length of this period P2 is, for example, approximately 0.4 seconds to approximately 1.2 seconds.

The electromagnetic brakes B1 to B6 enter a non-braking state with hold excitation, that is, the brake release state, after the braking is cancelled by overexcitation.

The cooling fan 250 is maintained in the OFF state.

The ventilation fan 260 is switched to the OFF state.

The aim of setting the cooling fan 250 and the ventilation fan 260 in the OFF state is to prevent an excessive increase in the power consumption of the control power supply 230 in the overexcitation, because a large overexcitation current is generated by the overexcitation of the electromagnetic brakes B1 to B6. In the period P2, the cooling fan 250 and all the ventilation fans 260 may be in the OFF state. However, instead of this, the power consumption of these fans may be made lower than in the period P3. For example, the cooling fan 250 and only a part of the ventilation fans 260 may be in the ON state, or the number of rotations thereof may be reduced. The power consumption of the cooling fan 250 and the ventilation fan 260 in the period P2 is referred to as "first power consumption". The first power consumption is preferably zero but may be a non-zero value.

As the control unit 240 accepts an instruction to cause the robot arm 120 to operate from the information processing device 300 at a start timing t1 of the period P2, the control unit 240, in response to this instruction, transmits a command to excite the motors M1 to M6 to the motor driver circuits 221 to 226 and also transmits a command to overexcite the electromagnetic brakes B1 to B6 in the braking state. In the example shown in FIG. 3, the timings of overexciting the electromagnetic brakes B1 to B6 are shifted from each other. Thus, the power consumption due to the overexcitation can be made uniform and therefore the power peak can be restrained.

Period P3

The period P3 is a period when the electromagnetic brakes B1 to B6 are in the brake release state, the motors M1 to M6 are excited, and the robot arm 120 is operable.

All of the electromagnetic brakes B1 to B6 are in the brake release state.

The cooling fan 250 is switched to the ON state.

All of the ventilation fans 260 are switched to the ON state.

As the method for generating a command to start driving the cooling fan 250 and the ventilation fan 260 at a start timing t2 of the period P3, for example, the following two methods are conceivable. In the first method, the control unit 240 measures time from the start timing t1 of the period P2, with a timer, and generates a drive command for the cooling fan 250 and the ventilation fan 260 after the lapse of a predetermined time. In the second method, the control unit 240 generates a drive command for the cooling fan 250 and the ventilation fan 260 substantially at the same time as transmitting a command to stop the overexcitation of the electromagnetic brake B1, which is the last one to be overexcited.

The power consumption of the cooling fan 250 and the ventilation fan 260 in the period P3 is referred to as "second power consumption". The second power consumption is higher than the first power consumption, which is the power consumption of the cooling fan 250 and the ventilation fan 260 in the period P2.

Period P4

A period P4 is a period immediately after the motors M1 to M6 are switched to the non-excitation state at a timing t3. The length of the period P4 is, for example, approximately one minute to approximately five minutes.

All of the electromagnetic brakes B1 to B6 are switched to the non-excitation brake active state.

The cooling fan 250 is maintained in the ON state.

All of the ventilation fans 260 are maintained in the ON state.

The reason for maintaining the cooling fan 250 and the ventilation fans 260 in the ON state is that the temperature Td of the motor driver circuits 221 to 226 is high immediately after the motors M1 to M6 are switched to the non-excitation state.

Period P5

A period P5 is a period when the motors M1 to M6 are in the non-excitation state, that is, the state of not being supplied with electric power. The state in the period P5 is the same as in the period P1.

The electromagnetic brakes B1 to B6 are in the non-electrified braking state, that is, the brake active state.

The cooling fan 250 is in the OFF state.

The ventilation fan 260 is in the ON state.

A start timing t4 of the period P5 is a time point when the temperature Td of the motor driver circuits 221 to 226 has sufficiently dropped. This timing t4 may be decided by the control unit 240 measuring the temperature Td of the motor driver circuits 221 to 226, using a temperature sensor, or may be decided by the control unit 240 measuring time from the start timing t3 of the period P4, with the timer. At the beginning of the period P5, the temperature Td of the motor driver circuits 221 to 226 rises slightly due to the switching of the cooling fan 250 to the OFF state. However, the scale of the rise is sufficiently small and does not pose any problem.

The temperature Td of the motor driver circuits 221 to 226 reaches a maximum value in the period P3. However, the cooling by the cooling fan 250 and the ventilation fan 260 is executed so that the temperature Td does not become excessively high. The power consumption Wc of the control power supply 230 reaches a maximum value Wc_max1 in the period P3. In the overexcitation period P2, the power consumption Wc is restrained to a smaller value than in the period P3. This point will be described further in detail later.

Figure 4:
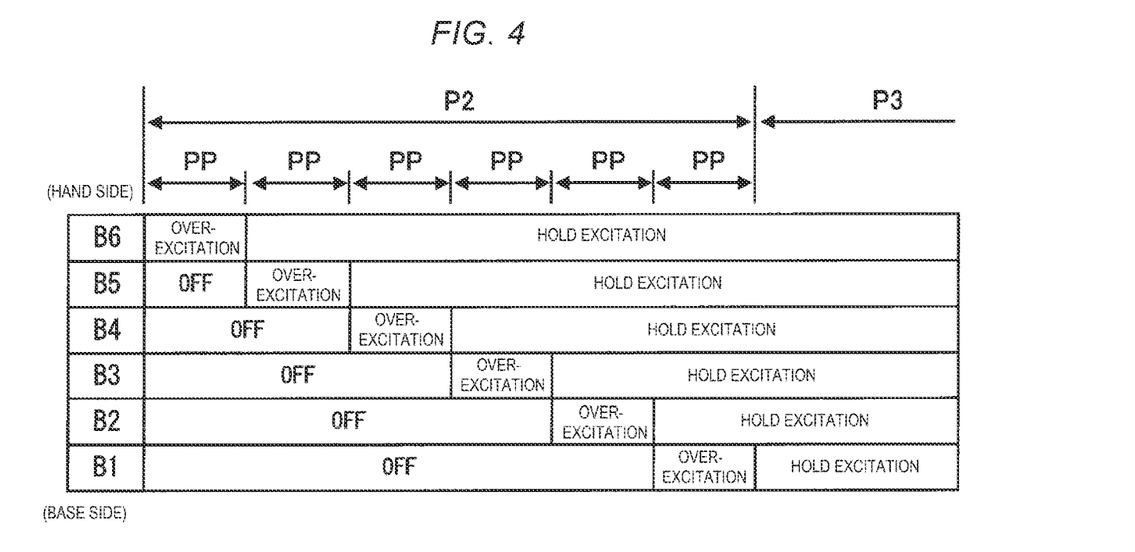
FIG. 4 is an explanatory view showing a change in the state of a plurality of electromagnetic brakes in the embodiment.

FIG. 4 is an explanatory view showing a change in the state of the plurality of electromagnetic brakes in the period P2 shown in FIG. 3. As described with reference to FIG. 3, in this embodiment, the timings of overexciting the electromagnetic brakes B1 to B6 are shifted from each other. More specifically, individual overexcitation periods PP during which the individual electromagnetic brakes are overexcited are shifted from each other so as not to overlap each other. Consequently, an increase in the power consumption due to the overlap of the individual overexcitation periods of the plurality of electromagnetic brakes can be prevented. Also, in this example, the electromagnetic brakes are overexcited in order from the electromagnetic brake B6 nearest to the hand of the robot arm 120. That is, the electromagnetic brake B6 nearest to the hand is overexcited first and the electromagnetic brake B1 nearest to the base 110 is excited last. Thus, the power consumption due to the overexcitation can be made even more uniform.

Figure 5:
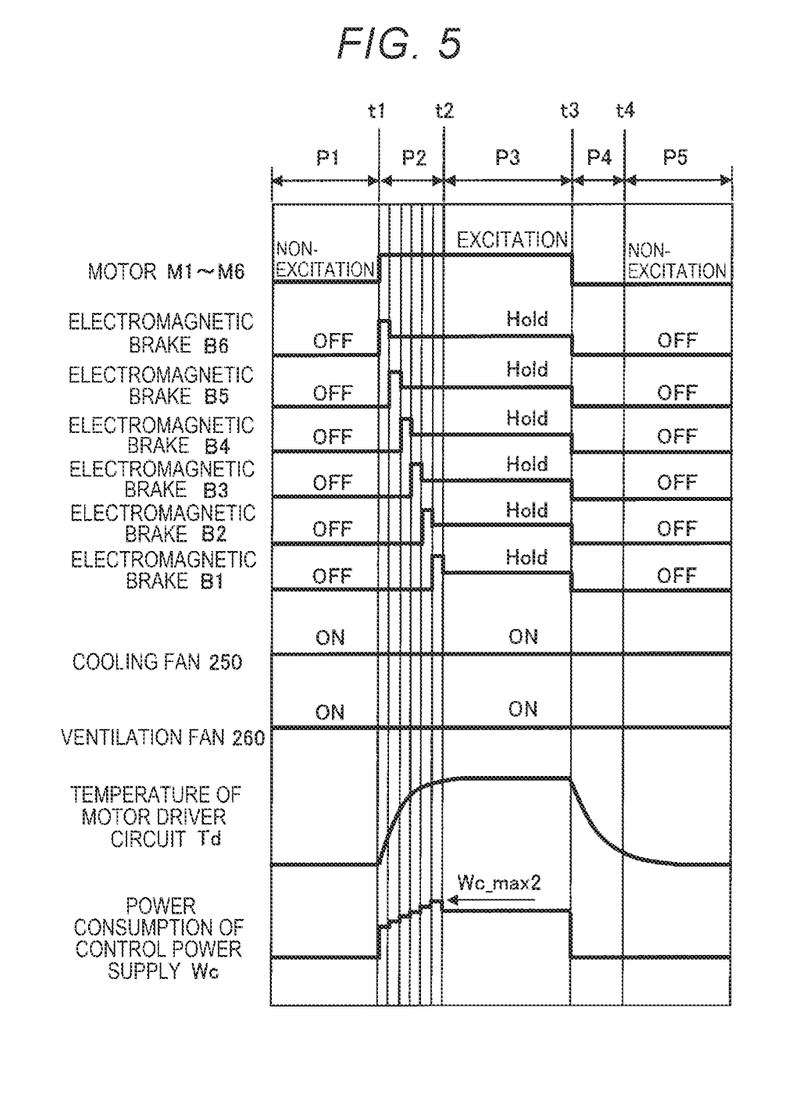
FIG. 5 is a timing chart showing a control operation in a comparative example.

FIG. 5 is a timing chart showing a control operation in a comparative example. The control operation in the comparative example differs from the control operation in the embodiment shown in FIG. 3 only in that the cooling fan 250 and the ventilation fan 260 are maintained in the ON state during all the periods. The other elements are the same as in FIG. 3. In this comparative example, the cooling fan 250 and the ventilation fan 260 are maintained in the ON state also in the overexcitation period P2 and therefore the power consumption Wc of the control power supply 230 is higher than in the period P3. The power consumption Wc reaches a maximum value Wc_max2 in the overexcitation period P2. This maximum value Wc_max2 is greater than the maximum Wc_max1 in the embodiment shown in FIG. 3.

In the overexcitation period P2, the amount of heat generated in the motor driver circuits 221 to 226 is small.

Therefore, even if the cooling fan 250 and the ventilation fan 260 are stopped, the influence of heat on the motor driver circuits 221 to 226 is small. Thus, in the embodiment shown in FIG. 3, the cooling ability of the cooling fan 250 and the ventilation fan 260 in the overexcitation period P2 is made lower than in the period P3 and the power consumption is thus reduced. As a result, both the reduction in the power supply capacity of the control power supply 230 and the cooling of the motor driver circuits 221 to 226 can be achieved.

As described above, in the embodiment, as the power consumption of the fans cooling the control device 200 in the overexcitation period P2, the first power consumption, which is lower than the second power consumption in the period P3 after the overexcitation period P2, is employed. Therefore, an excessive increase in the power consumption during the overexcitation period P2 can be prevented. Thus, the control power supply 230 can be reduced in size and cost.

In the embodiment, the control device 200 controls the operation of the plurality of motors M1 to M6 and the plurality of electromagnetic brakes B1 to B6. However, the numbers of motors and electromagnetic brakes to be controlled can be any number equal to or greater than one.

Figure 6:
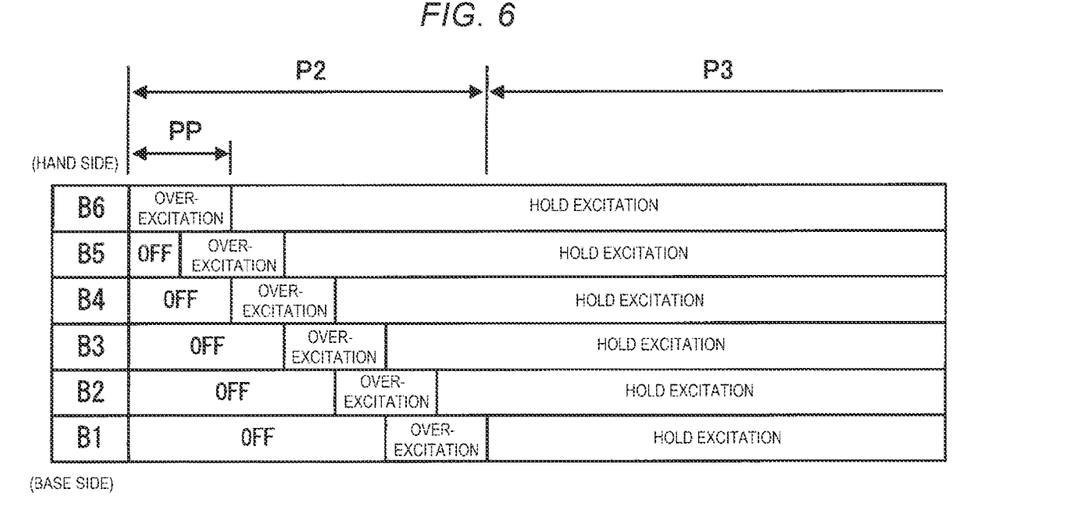
FIG. 6 is an explanatory view showing a change in the state of a plurality of electromagnetic brakes in another embodiment.

FIG. 6 is an explanatory view showing a change in the state of a plurality of electromagnetic brakes in another embodiment. This embodiment differs from the embodiment shown in FIG. 4 only in that the individual overexcitation periods PP of the electromagnetic brakes partly overlap each other. More specifically, this embodiment is the same as in the embodiment shown in FIG. 4 in that the timings of overexciting the electromagnetic brakes B1 to B6 are shifted from each other, but in FIG. 6, the individual overexcitation periods PP are shifted from the neighboring individual overexcitation periods PP by half. Even in this way, an increase in the power consumption due to the overlap of all the individual overexcitation periods PP can be prevented. Also, in this example, the length of the entire overexcitation period P2 is half the length of the overexcitation period P2 shown in FIG. 4. Therefore, the robot arm 120 can be moved earlier.

In the embodiments shown in FIGS. 4 and 6, the restraining effect for the power consumption of the control power supply 230 in the overexcitation period P2 can be achieved by both (i) a first feature of employing the first power consumption, which is lower than the second power consumption in the period P3 after the overexcitation period P2, as the power consumption of the fans cooling the control device 200, and (ii) a second feature of shifting the individual overexcitation periods PP from each other. Of these, the second feature may be omitted. That is, the individual overexcitation periods PP of the plurality of electromagnetic brakes may be set to overlap each other. However, when both the first feature and the second feature are employed, the restraining effect for the power consumption of the control power supply 230 can be enhanced further.

Other Aspects

The present disclosure is not limited to the foregoing embodiments and can be implemented according to various aspects without departing from the spirit and scope of the present disclosure. For example, the present disclosure can be implemented according to the aspects described below. A technical feature in the foregoing embodiments corresponding to a technical feature in the aspects described below can be replaced or combined with another where appropriate, in order to solve a part or all of the problems of the present disclosure or in order to achieve a part or all of the effects of the present disclosure. The technical feature can be deleted where appropriate, unless described as essential in this specification.

(1) According to a first aspect of the present disclosure, a control method for a control device controlling a robot arm having a motor braked by an overexcitation-type electromagnetic brake is provided. The control method includes: (a) carrying out overexcitation of the electromagnetic brake; (b) controlling a fan cooling the control device in such a way that a power consumption of the fan becomes a first power consumption in an overexcitation period during which the overexcitation is carried out; and (c) controlling the fan in such a way that the power consumption of the fan becomes a second power consumption higher than the first power consumption, after the overexcitation period.

This control method employs the first power consumption, which is lower than the second power consumption after the overexcitation period, as the power consumption of the fan in the overexcitation period. Therefore, the control method can prevent an excessive increase in the power consumption in the overexcitation period.

(2) In the control method, the robot arm may have a plurality of the electromagnetic brakes and a plurality of the motors, and timings of overexciting the electromagnetic brakes may be shifted from each other.

This control method can make the power consumption due to the overexcitation uniform and therefore can restrain the power peak.

(3) In the control method, the plurality of the electromagnetic brakes may be coupled together via a common power line, and the plurality of the electromagnetic brakes may be overexcited in order from the electromagnetic brake nearest to a hand of the robot arm.

This control method can make the power consumption due to the overexcitation even more uniform and therefore can restrain the power peak.

(4) In the control method, the fan may include a ventilation fan exchanging air inside and outside the control device, and the ventilation fan may start operating after the control device accepts, from outside, an instruction to cause the robot arm to operate.

This control method can cause the ventilation fan to operate when ventilation is necessary, and can also restrain the power peak.

(5) In the control method, the control device may have a plurality of the ventilation fans, and in the (b), at least a part of the plurality of the ventilation fans may be stopped.

This control method can lower the power peak further.

(6) In the control method, in the (b), all of the plurality of the ventilation fans may be stopped.

This control method can lower the power peak further.

(7) In the control method, the control device may have a motor driver circuit supplying electric power to the motor. The fan may include a cooling fan blowing air to the motor driver circuit. In the (b), the cooling fan may be stopped.

This control method can prevent an excessive rise in the temperature of the motor driver circuit even if the cooling fan is stopped in the overexcitation period. Therefore, the control method can restrain the power peak.

(8) According to a second aspect of the present disclosure, a non-transitory computer-readable storage medium storing a computer program for control of a control device controlling a robot arm having a motor braked by an overexcitation-type electromagnetic brake is provided. The computer program causes a processor to execute: (a) processing of carrying out overexcitation of the electromagnetic brake and thus switching the electromagnetic brake from a brake active state to a brake release state; (b) processing of controlling a fan cooling the control device in such a way that a power consumption of the fan becomes a first power consumption in an overexcitation period during which the overexcitation is carried out; and (c) processing of controlling the fan in such a way that the power consumption of the fan becomes a second power consumption higher than the first power consumption, after the overexcitation period.

(9) According to a third aspect of the present disclosure, a control device controlling a robot arm having a motor braked by an overexcitation-type electromagnetic brake is provided. The control device includes: a motor diver circuit supplying electric power to the motor; a control power supply supplying electric power to the electromagnetic brake; a fan operating when receiving supply of electric power from the control power supply and thus cooling the control device; and a control unit controlling the motor driver circuit and the fan. The control unit executes: (a) processing of carrying out overexcitation of the electromagnetic brake; (b) processing of controlling the fan in such a way that a power consumption of the fan becomes a first power consumption in an overexcitation period during which the overexcitation is carried out; and (c) processing of controlling the fan in such a way that the power consumption of the fan becomes a second power consumption higher than the first power consumption, after the overexcitation period.

The present disclosure can also be implemented according to other aspects than the foregoing aspects. For example, the present disclosure can be implemented according an aspect such as a robot system having a robot and a control device, a computer program for implementing the functions of the control device, and a non-transitory storage medium in which the computer program is recorded.

What is claimed is:

1. A control method for a control device controlling a robot arm of a robot for causing a processor to execute a process, the control method comprising executing on the processor the steps of:
    performing an overexcitation operation with respect to an electromagnetic brake of a motor by applying a first motor power to the motor, the electromagnetic brake being in a break release state by the overexcitation operation such that the motor is ready to drive the robot arm;
    controlling a fan configured to cool the control device in such a way that a power consumption of the fan becomes a first power consumption during a period of the overexcitation operation;
    performing an excitation operation with respect to the electromagnetic brake of the motor by applying a second motor power to the motor, the motor driving the robot arm with the applied second motor power while the electromagnetic brake maintains the break release state, the first motor power being higher than the second motor power;
    controlling the fan in such a way that the power consumption of the fan becomes a second power consumption during a period of the excitation operation, the first power consumption being lower than the second power consumption; and
    performing a non-excitation operation with respect to the electromagnetic brake of the motor by applying no motor power to the motor, the electromagnetic brake being in a break active state by the non-excitation operation such that the motor is braked by the electromagnetic brake.

2. The control method according to claim 1, wherein
    the robot arm has a plurality of the electromagnetic brakes and a plurality of the motors, and
    timings of performing of the overexcitation operation with respect to the plurality of the electromagnetic brakes are shifted from each other.

3. The control method according to claim 2, wherein
    the plurality of the electromagnetic brakes are coupled together via a common power line, and
    the plurality of the electromagnetic brakes are overexcited in order from the electromagnetic brake nearest to a hand of the robot arm.

4. The control method according to claim 1, wherein
    the fan includes a ventilation fan exchanging air inside and outside the control device, and
    the ventilation fan starts operating after the control device accepts, from outside, an instruction to cause the robot arm to operate.

5. The control method according to claim 4, wherein
    the control device has a plurality of the ventilation fans, and
    in the controlling of the fan with the first power consumption, at least a part of the plurality of the ventilation fans is stopped.

6. The control method according to claim 5, wherein
    in the controlling of the fan with the first power consumption, all of the plurality of the ventilation fans are stopped.

7. The control method according to claim 1, wherein
    the control device has a motor driver circuit supplying either the first motor power or the second motor power to the motor,
    the fan includes a cooling fan blowing air to the motor driver circuit, and
    in the controlling of the fan with the first power consumption, the cooling fan is stopped.

8. A non-transitory computer-readable storage medium storing a computer program for control of a control device controlling a robot arm of a robot, the computer program causing a computer to execute a process by a processor so as to perform the steps of:
    performing an overexcitation operation with respect to an electromagnetic brake of a motor by applying a first motor power to the motor, the electromagnetic brake being in a break release state by the overexcitation operation such that the motor is ready to drive the robot arm;
    controlling a fan configured to cool the control device in such a way that a power consumption of the fan becomes a first power consumption during a period of the overexcitation operation;
    performing an excitation operation with respect to the electromagnetic brake of the motor by applying a second motor power to the motor, the motor driving the robot arm with the applied second motor power while the electromagnetic brake maintains the break release state, the first motor power being higher than the second motor power;
    controlling the fan in such a way that the power consumption of the fan becomes a second power consumption during a period of the excitation operation, the first power consumption being lower than the second power consumption; and
    performing a non-excitation operation with respect to the electromagnetic brake of the motor by applying no motor power to the motor, the electromagnetic brake being in a break active state by the non-excitation operation such that the motor is braked by the electromagnetic brake.

9. A control device controlling a robot arm of a robot, the control device comprising:
- a motor diver circuit supplying electric power to a motor to drive the robot arm;
- a fan configured to cool the control device;
- a memory configured to store a program; and
- a processor configured to execute the program so as to:
  - perform an overexcitation operation with respect to an electromagnetic brake of a motor by applying a first motor power, as the electric power, to the motor, the electromagnetic brake being in a break release state by the overexcitation operation such that the motor is ready to drive the robot arm;
  - control the fan to cool the control device in such a way that a power consumption of the fan becomes a first power consumption during a period of the overexcitation operation;
  - perform an excitation operation with respect to the electromagnetic brake of the motor by applying a second motor power, as the electric power, to the motor, the motor driving the robot arm with the applied second motor power while the electromagnetic brake maintains the break release state, the first motor power being higher than the second motor power;
  - control the fan in such a way that the power consumption of the fan becomes a second power consumption during a period of the excitation operation, the first power consumption being lower than the second power consumption; and
  - perform a non-excitation operation with respect to the electromagnetic brake of the motor by applying no motor power to the motor, the electromagnetic brake being in a break active state by the non-excitation operation such that the motor is braked by the electromagnetic brake.

\* \* \* \* \*